United States Patent

Ishizuka Takashi et al.

[11] 4,007,146
[45] Feb. 8, 1977

[54] AQUEOUS INSULATING VARNISHES

[75] Inventors: Takashi Ishizuka; Shiro Mazaki; Naoki Miwa; Masatosi Maesoba, all of Ibaraki, Japan

[73] Assignee: Nitto Electric Industrial Co., Ltd., Ibaraki, Japan

[22] Filed: Feb. 18, 1975

[21] Appl. No.: 550,504

[30] Foreign Application Priority Data

Feb. 15, 1974 Japan .............................. 49-18959

[52] U.S. Cl. .................... 260/29.2 E; 260/29.2 N; 260/31.4 R; 260/31.6; 260/32.6 R; 260/33.2 R; 260/33.4 R; 260/75 R; 260/75 T; 428/379

[51] Int. Cl.² .......................................... C08J 3/00

[58] Field of Search ............... 260/29.2 E, 29.2 N, 260/75 R, 75 T, 31.4, 32.6 R, 31.6, 33.2 R, 33.4 R; 428/379

[56] References Cited

UNITED STATES PATENTS

| | | | |
|---|---|---|---|
| 3,021,308 | 2/1962 | Gaywood, Jr. et al. | 260/75 R |
| 3,067,158 | 12/1962 | Bolton | 260/29.2 E |
| 3,068,207 | 12/1962 | Iannicelli | 260/75 R |
| 3,205,192 | 9/1965 | Denson | 260/75 T |
| 3,459,584 | 8/1969 | Caldwell | 260/75 R |
| 3,725,329 | 4/1973 | Jacoby et al. | 260/75 R |

Primary Examiner—J. Ziegler
Attorney, Agent, or Firm—Sughrue, Rothwell, Mion, Zinn & Macpeak

[57] ABSTRACT

An aqueous insulating varnish which comprises an aqueous medium containing dissolved therein a polyester resin having an acid value of about 20 to 200 with a volatile basic compound, the resin being obtained by reacting A. an organic polycarboxylic acid component comprising
  a. at least 30 mol% of at least one of an aromatic tricarboxylic acid and the anhydride thereof, in which up to about 30 mol% of the tricarboxylic acid and anhydride thereof can be replaced by at least one of an aromatic tetracarboxylic acid and the anhydride thereof, and
  b. about 0 to 70 mol% of at least one of a dicarboxylic acid and the anhydride thereof, and B. an organic polyhydric alcohol component containing at least 20 mol% of a polyethylene terephthalate oligomer represented by the formula

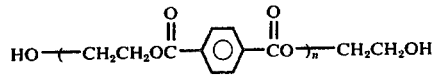

wherein $n$ is an integer of 1 to 5, in a OH/COOH equivalent ratio of about 1.0 to 2.0.

12 Claims, No Drawings

AQUEOUS INSULATING VARNISHES

BACKGROUND OF THE INVENTION

1. Field of the Invention

This invention relates to aqueous insulating varnishes. More particularly, the invention relates to aqueous insulating polyester resin varnishes.

2. Description of the Prior Art

Hitherto, almost all insulating varnishes and particularly wire enamels are the so-called solvent-type varnishes in which an organic solvent such as cresol, xylol or naphtha is used. These conventional varnishes have disadvantages in that the solvent and gases of decomposition are dispersed in the air in the production of insulated wires and the cost is high because the solvent should be completely incinerated by a combustion furnace. Further, these organic solvents not only cause environmental problems such as air pollution but also the working environment is deteriorated because of their bad smell, and fire is always a hazard due to the flammability of the solvents. Recently, it is particularly desired to obtain insulating varnishes which do not have these disadvantages which give rise to a poor environment.

Of wire enamels, polyester resin varnishes have particularly been employed most widely due to their properties, processability and relatively low cost involved. Hence, it has been especially desired to develop polyester resin varnishes which do not cause environmental problems. However, a polyester resin varnish which satisfies the requirement of properties and the like has not yet been provided.

SUMMARY OF THE INVENTION

It is an object of the present invention to provide insulating varnishes which do not have the above described disadvantages.

As the result of extensive research for improving the above described disadvantages, it has been found that an aqueous insulating varnish which comprises an aqueous medium containing dissolved therein a polyester resin having an acid value of about 20 to 200 with a volatile basic compound, the resin being obtained by reacting.

A. an organic polycarboxylic acid component comprising a. at least 30 mol% of at least one of an aromatic tricarboxylic acid and the anhydride thereof, in which up to 30 mol% of the aromatic tricarboxylic acid and the anhydride thereof can be replaced by at least one of an aromatic tetracarboxylic acid and the anhydride thereof, and b. about 0 to 70 mol% of at least one of a dicarboxylic acid and the anhydride thereof, and B. an organic polyhydric alcohol component containing at least 20 mol% of a polyethylene terephthalate oligomer represented by the formula

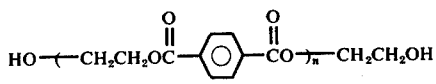

wherein n is an integer of 1 to 5, in a OH/COOH equivalent ratio of about 1.0 to 2.0 has excellent properties as an insulating varnish, and thus the present invention has been accomplished based on this finding.

DETAILED DESCRIPTION OF THE INVENTION

Aromatic tricarboxylic acids which can be used in this invention include trimellitic acid or the anhydride thereof, hemimellitic acid or the anhydride thereof and trimesic acid having the formula

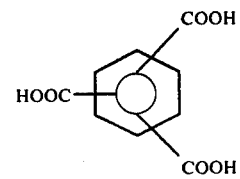

(or the anhydride thereof); 3,4,3'(or 3,4,4', etc.)-diphenyltricarboxylic acid having the formula

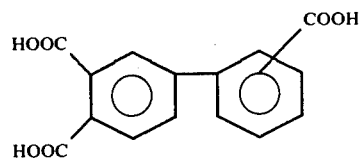

or the anhydride thereof, 3,4,3'(or 3,4,4', etc.)-tricarboxydiphenylmethane; 3,4,3'(or 3,4,4', etc.)-tricarboxydiphenyl ether, 3,4,3'(or 3,4,4', etc.)-tricarboxydiphenyl sulfide, 3,4,3'(or 3,4,4', etc.)-tricarboxydiphenyl sulfone, 3,4,3'(or 3,4,4', etc.)-tricarboxydiphenyl ketone and 3,4,3'(or 3,4,4', etc.)-tricarboxydiphenylpropane having the formula

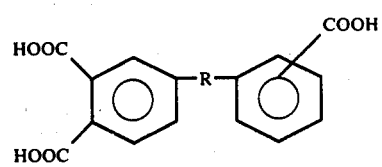

wherein R represents a methylene group, an oxygen atom, a sulfur atom, a —SO₂— group,

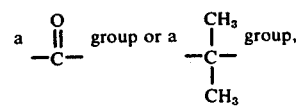

or the anhydrides thereof, or mixtures thereof.

In the present invention, a part, i.e., up to about 30 mol%, of the above described aromatic tricarboxylic acid or the anhydride thereof can be replaced by an aromatic tetracarboxylic acid or the anhydride thereof to prepare the water-soluble insulating varnish. Such an aromatic tetracarboxylic acid or the anhydride thereof includes (i) pyromellitic acid or the anhydride thereof, 3,3',4,4'-diphenyltetracarboxylic acid or the anhydride thereof, or the isomers thereof; (ii) those tetracarboxylic acids represented by the general formula

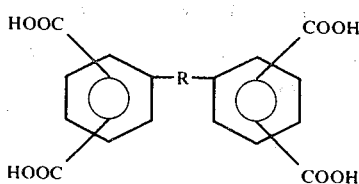

wherein R represents a methylene group, an oxygen atom, a sulfur atom, a —SO$_2$— group,

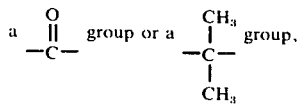

a $\overset{\text{O}}{\underset{}{-\text{C}-}}\!\!\!\overset{\|}{}$ group or a $-\underset{\underset{\text{CH}_3}{|}}{\overset{\overset{\text{CH}_3}{|}}{\text{C}}}-$ group, such as 3,3'4,4'-diphenylmethanetetracarboxylic acid or the anhydride thereof, 3,3',4,4'-diphenyl ether tetracarboxylic acid or the anhydride thereof, 3,3',4,4'-diphenyl ketone tetracarboxylic acid or the anhydride thereof, 3,3',4,4'-diphenylsulfone tetracarboxylic acid or the anhydride thereof, 3,3',4,4'-diphenyl sulfide tetracarboxylic acid or the anhydride thereof, 3,3',4,4'-diphenyl tetracarboxylic acid or the anhydride thereof and the like; and (iii) those tetracarboxylic acids represented by the formula

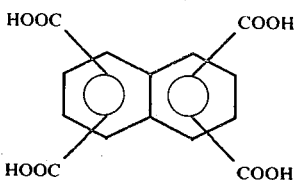

, such as naphthalene-1,2,5,6-tetracarboxylic acid, naphthalene-1,4,5,8-tetracarboxylic acid, naphthalene-2,3,6,7-tetracarboxylic acid, and the like, or the anhydrides thereof.

Organic dicarboxylic acids or the anhydrides thereof which can be used together with the aromatic tricarboxylic acids or the anhydrides thereof include succinic acid, succinic anhydride, malonic acid, adipic acid, sebacic acid, phthalic acid, phthalic anhydride, isophthalic acid, terephthalic acid, naphthalene-1,4(or 1,5, 2,6, etc.)-dicarboxylic acid having the formula

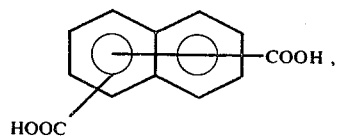

3,3'(or 4,4', etc.)-dicarboxydiphenyl having the formula

or 3,3'(or 4,4', etc.)-dicarboxydiphenyl sulfide, 3,3'(or 4,4', etc.)-dicarboxyphenyl ether, 3,3'(or 4,4', etc.)-dicarboxydiphenylmethane, 3,3'(or 4,4', etc.)-dicarboxydiphenyl sulfone, 3,3'(or 4,4', etc.)-dicarboxydiphenyl ketone, or 3,3' (or 4,4', etc.)-dicarboxydiphenyl propane having the formula

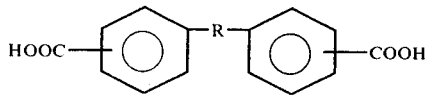

wherein R represents a methylene group, an oxygen atom, a sulfur atom, an —SO$_2$— group,

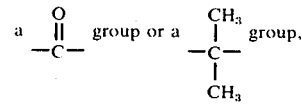

a $\overset{\text{O}}{\underset{}{-\text{C}-}}\!\!\!\overset{\|}{}$ group or a $-\underset{\underset{\text{CH}_3}{|}}{\overset{\overset{\text{CH}_3}{|}}{\text{C}}}-$ group, or mixtures thereof.

The aromatic tricarboxylic acids (or anhydrides thereof) should be used in an amount of at least 30 mol%. If they are not used in the amount of at least 30 mol%, the resulting resin has poor solubility in water and the thermal and electrical properties of the coating films obtained are deteriorated. The aromatic tricarboxylic acid can suitably be used up to about 100 mol%. A preferred range of the aromatic tricarboxylic acid is from about 50 to 100 mol%.

The polyethylene terephthalate oligomers which can be used in the present invention have the formula

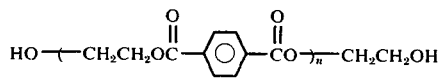

wherein $n$ is an integer of 1 to 5. When $n$ is greater than 5, the resulting polyester resin has a high molecular weight which renders the resin difficult to water-solubilize. Polyethylene terephthalate oligomers having the formula above wherein n is an integer of 1 to 5 include those prepared from terephthalic acid or a lower alkyl ester thereof (e.g., having about 1 to 5 carbon atoms in the alkyl moiety such as the methyl, ethyl, n-propyl, n-butyl and amyl esters) and ethylene glycol. Dimethylterephthalate ($n$=1) is preferably used. In addition, the polyethylene terephthalate oligomer can be prepared from terephthalate acid and ethylene oxide. Generally, bis(2-hydroxyethyl)terephthalate wherein n is 1 is preferably used. The present invention is characterized by using these polyethylene terephthalate oligomers to produce aqueous polyester resin varnishes having extremely excellent mechanical and thermal properties with respect to the coating film after baking when compared with conventional aqueous alkyd resin varnishes which are produced using phthalic anhydride, isophthalic acid, maleic anhydride and the like.

The possibility of using polyethylene isophthalate oligomer has also been studied, but attempts to obtain varnishes which satisfy the requirement of thermal resistance were unsuccessful.

Further, attempts have also been made to use, terephthalic acid and ethylene glycol as the monomer units for the polyethylene terephthalate oligomers, from the initial stage of the reaction, instead of the oligomer per se. However, the reaction requires a prolonged period of time and the resulting polyester resin tends to be insoluble in water and forms a cloudy solution.

In the present invention, the organic polyhydric alcohol component should contain at least 20 mol%, preferably 25 to 75 mol%, of the polyethylene terephthalate oligomer of the formula described above. If the polyethylene terephthalate oligomer is used in an amount less than 20 mol%, the thermal property of the baked coating film obtained on baking the resulting aqueous insulating varnish is extremely deteriorated.

The organic polyhydric alcohols which can be used together with the above described oligomers can be any aliphatic and aromatic polyhydric alcohols, and include ethylene glycol, propylene glycol, 1,4-butanediol, 1,5-pentanediol, 1,6-hexanediol, 1,7-heptanediol, 1,8-octanediol, 1,9-nonanediol, 1,10-decanediol, diethylene glycol, dipropylene glycol, triethylene glycol, glycerin, trimethylolpropane, tris(2-hydroxyethyl)isocyanurate, 1,2,6-hexanetriol, 3-methyl-1,3,5-hexane triol, pentaerythritol, 4,4'-dihydroxymethyldiphenyl, 4,4'-dihydroxyethyldiphenyl, 4,4'-dihydroxymethyldiphenyl-methane, 4,4'-dihydroxyethylethyldiphenylmethane, 4,4'-dihydroxymethyldiphenyl ether, 4,4'-dihydroxyethyldiphenyl ether, 4,4'-dihydroxymethyldiphenyl sulfone, 4,4'-dihydroxyethyldiphenyl sulfone, 4,4'-dihydroxymethyldiphenyl ketone, 4,4'-dihydroxyethyldiphenyl ketone, 4,4'-dihydroxymethyldiphenylpropane, 4,4'-dihydroxyethyldiphenylpropane, 4,4'-dihydroxymethyl sulfide, 4,4'-dihydroxyethyldiphenyl sulfide and mixtures thereof.

The aqueous insulating varnishes of the present invention can be prepared as follows.

The organic polycarboxylic acids (or anhydrides thereof) comprising (1) at least 30 mol% of aromatic tricarboxylic acids (or anhydrides thereof) and up to 30 mol% of the aromatic carboxylic acids (or anhydrides thereof) being replaced by aromatic tetracarboxylic acids (or anhydrides thereof) and (2) 0 to 70 mol% of dicarboxylic acids as described hereinbefore as an acid component are reacted with the organic polyhydric alcohols containing at least 20 mol% of an polyethylene terephthalate oligomer as an alcohol component with the alcohol being used in an excessive amount.

In this reaction, the equivalent ratio of the acids and the alcohols (OH/COOH) is in a range of about 1.0 to 2.0, preferably 1.0 to 1.5 (one carboxylic acid anhydride group being calculated as two carboxyl groups). If the equivalent ratio is less than about 1.0, carboxyl groups remain in the baked coating film obtained by baking the resulting polyester resin resulting in a deterioration of film properties. If the equivalent ratio is greater than about 2.0, the resulting polyester resin has too low a molecular weight which also results in a deterioration of film properties.

Of course, it is apparent to those skilled in the art that an equivalent ratio greater than about 2.0 can be used if the organic polyhydric alcohol is removed from the reaction system, for example, by distillation of the resulting reaction product under reduced pressure to increase the molecular weight of the polyester resin. Further, an equivalent ratio greater than about 2.0 can be employed if the organic polyhydric alcohol is merely blended after completion of the reaction as a film forming assistant (co-solvent) at baking.

The reaction between the above described acid component and alcohol component can be carried out at a temperature of from about 100° to 300° C, preferably 160° to 220° C. When the reaction proceeds for several hours at the above described temperature, water is distilled off and the reaction mixture gradually becomes viscous and the acid value thereof gradually decreases.

The reaction is usually stopped when the acid value is in the range of about 20 to 200, preferably 50 to 150. If the acid value is below about 20, the finally resulting aqueous insulating varnish is cloudy, and the mechanical properties of the baked coating film and the film appearance deteriorate. If the acid value is above about 200, the number of residual carboxyl groups in the resulting polyester resin is unnecessarily large which results in a longer hardening time at baking, or the carboxyl groups remain in the baked coating film thereby deteriorating the mechanical and electrical properties of the film.

The reaction between the acid component and the alcohol component according to the present invention can be conducted by either charging these two reactants at once from the initial stage of the reaction or reacting the acid component with the polyethylene terephthalate oligomer to prepare a resin having an increased molecular weight and then adding the organic polyhydric alcohol to react with the residual carboxyl groups present in the resin molecule. Thus, a polyester resin having an acid value of about 20 to 200 and a low molecular weight up to about 5000 is obtained.

A volatile basic compound, such as aqueous ammonia, and water are then added thereto to neutralize the residual carboxyl groups thereby producing an aqueous insulating varnish. When the aqueous insulating varnish thus obtained is baked usually at a temperature higher than about 200° C, preferably 300° to 500° C, the volatile basic compound such as ammonia evaporates and cross-linking between the molecules proceeds to provide a coating film having an excellent insulating property.

As compounds for rendering the polyester resin water-soluble, basic compounds which are volatile at the temperature of baking the aqueous insulating varnish can be used in addition to the above described aqueous ammonia. Typical examples of such compounds include in addition to ammonia, trialkylamines such as triethylamine, trimethylamine, tributylamine and the like, N-alkyldiethanolamines such as N-methyldiethanolamine, N-ethyldiethanolamine, N-propyldiethanolamine and the like, N,N-dialkylethanolamines such as N,N-dimethylethanolamine, N,N-diethylethanolamine, N,N-dibutylethanolamine and the like, monoethanolamine, diethanolamine, triethanolamine and mixtures of these compounds. These compounds are added in an amount sufficient to convert the resin into a water-soluble resin. That is, they are added in an amount sufficient to neutralize the carboxyl groups present in the resin. However, water-solubilization does not necessarily require conversion of all of the carboxyl groups remaining in the resin after polymerization into the salt form. Therefore, they only have to be added in an amount greater than that which enables the conversion of the resin into a water-soluble resin, generally from about 0.3 to about 3 equivalents to the remaining carboxyl groups. Ammonia or aqueous ammonia can be added in a large excess amount because the excess thereof can be removed easily by heating the varnishes to about 100° C.

The functional characteristics of varnishes according to the present invention will vary to some extent depending upon starting materials and the degree of polymerization employed, but generally the non-volatile components contained in the aqueous solution can range from about 30 to about 55% by weight (measured as solid content at 200° C ± 2° C for 2 hours) with the viscosity being in the range of about 1 to about 100 poises (measured at 30° C using a B type viscometer).

When conventional solvent-type varnishes are baked, it has been necessary to incorporate an organic metal compound such as tetrabutyl titanate as a cross-linking agent to obtain a film having satisfactory properties. On the other hand, the present invention is also characterized in that a baked film having sufficiently good properties can be obtained without using a cross-linking agent. However, in some cases, it is effective in this invention, as well, to incorporate cross-linking agents such as a water-soluble organic metal compound, e.g., ammonium titanate lactate and ammonium zirconium lactate, a water-soluble phenol resin, e.g., WP-71 (a tradename for a completely water-solubilized phenolformaldehyde resin, manufactured by Gunei Kagaku K.K., Japan), a water-soluble amino resin, e.g., MU-700 (a tradename for a water-solubilized alkylated methylolmelamine resin, manufactured by Fuji Kasei K.K., Japan) and PU-700 (a tradename for a water-solubilized alkylated methylolguanamine resin), a water-soluble compound, e.g., hexamethoxymethylated melamine and the like in an amount less than about 10% by weight, usually from 0.1 to 5% by weight, based on the non-volatile component in the varnish.

The aqueous insulating varnishes of the present invention are useful as a baking varnish, particularly, as wire enamels for coating conductors. They can be used for producing flexible printed-circuit plates, flat heating plates and tape cables by applying them to conductive foils and baking. If desired, they can be used in transports such as vehicles, ships and aircraft, building materials such as aluminum window sashes and household goods such as refrigerators and washing machines. Further, the aqueous insulating varnishes of the present invention can be used as coatings for top coats and primer coatings.

The aqueous insulating varnishes obtained by the present invention can also be applied to conductors by electric methods, for example, by electrodeposition and baked to obtain useful coating films as disclosed in Japanese Patent Publication No. 10541/1974, British Patent Nos. 723,072 and 1,073,911 and French Patent No. 1,521,452.

Further, a film-forming assistant (co-solvent) can also be employed in order to improve the flowability of the varnish at baking and the appearance of the resulting baked coating film. Such an assistant can be added in an amount ranging from about 5 to about 50% by weight based on the weight of the non-volatile components contained in the varnish. Examples of the film-forming assistants are ethylene glycol monomethyl ether, ethylene glycol monoethyl ether, ethylene glycol monoisopropyl ether, ethylene glycol monobutyl ether, ethylene glycol monoisobutyl ether, diethylene glycol monoethyl ether, diethylene glycol monoisopropyl ether, diethylene glycol monobutyl ether, diethylene glycol monoisobutyl ether, triethylene glycol monomethyl ether, triethylene glycol monoethyl ether, triethylene glycol monobutyl ether, ethylene glycol monomethyl ether acetate, ethylene glycol monoethyl ether acetate, ethylene glycol, propylene glycol, diethylene glycol, dipropylene glycol, triethylene glycol, glycerin, N,N-dimethylformamide, N,N-dimethylacetamide, N,N-diethylformamide, N-methyl-2-pyrrolidone, N,N-diethylacetamide, N,N-dimethylmethoxyacetamide, N-methylcaprolactam and the like.

The present invention is illustrated in greater detail by reference to the following examples. However, the present invention is not intended to be limited to these examples. Unless otherwise indicated, all parts, percents, ratios and the like are by weight.

EXAMPLE 1

192 g (1.0 mol) of trimellitic acid anhydride, 254 g (1.0 mol) of bis(2-hydroxyethyl)terephthalate and 46 g (0.5 mols) of glycerin where charged in a 1 liter four-necked flask equipped with a condenser, a thermometer, a dropping funnel and a stirrer. The mixture was heated while stirring for 30 minutes to the vicinity of 180° C whereupon water began to distil off. The mixture was reacted at 180° C for 2 hours to obtain a colorless transparent viscous resinous product having an acid value of 145. At this point, the temperature was reduced to 110° C, and 90 g of aqueous ammonia of industrial grade (concentration, above 28%) diluted with 100 g of water was added thereto using the dropping funnel. The resulting mixture was agitated at 100° C for 30 minutes thereby evaporating the excess ammonia to obtain a colorless transparent aqueous insulating varnish. The varnish was diluted with water to a viscosity of 12 poises (measured at 30° C using a B type viscometer, hereinafter the same). The non-volatile content of the varnish thus obtained was found to be 44.6% (200° ± 2° C, 2 hours drying, hereinafter the same).

EXAMPLE 2

96 g (0.5 mols) of trimellitic acid anhydride, 166 g (1.0 mol) of isophthalic acid, 254 g (1.0 mol) of bis(2-hydroxyethyl)terephthalate, 46 g (0.5 mols) of glycerin and 62 g (1.0 mol) of ethylene glycol were charged in a 1 liter four-necked flask equipped with a condenser, a thermometer, a dropping funnel and a stirrer. The resulting mixture was heated while stirring and water began to distil off at a temperature of about 180° C. At this temperature, the mxiture was reacted for 1 hour to obtain a resin having an acid value of 68. At this point, the temperature was reduced to 110° C, and 60 g of aqueous ammonia of industrial grade (concentration, above 28%) diluted with 100 g of water was added thereto using the dropping funnel. The resulting mixture was stirred at 100° C for 30 minutes thereby evaporating excessive ammonia to obtain a colorless transparent aqueous insulating varnish. The varnish was then diluted with water to a viscosity of 20 poises. The non-volatile content of the varnish thus obtained was 48.2%.

EXAMPLE 3

57.6 g (0.3 mols) of trimellitic acid anhydride, 99.6 g (0.6 mols) of isophthalic acid, 21.8 g (0.1 mol) of pyromellitic acid anhydride, 254 g (1.0 mol) of bis(2-hydroxyethyl)-terephthalate and 46 g (0.5 mols) of glycerin were charged in a 1 liter four-necked flask equipped with a condenser, a thermometer, a dropping funnel and a stirrer. The mixture was heated while stirring to the vicinity of 180° C whereupon water began to distil off. At this temperature the mixture was reacted for 1.5 hours to obtain a colorless transparent viscous resinous product having an acid value of 80. At this point, the temperature was reduced to 110° C, and 60 g of aqueous ammonia of industrial grade (concentration, above 28%) diluted with 100 g of water was added thereto using the dropping funnel. The resulting mixture was stirred at 100° C for 30 minutes thereby evaporating the excess ammonia to obtain a colorless transparent aqueous insulating varnish. The varnish was then diluted with water to a viscosity of 18 poises. The non-volatile content of the varnish thus obtianed was found to be 46.5%.

EXAMPLE 4

153.6 g (0.8 mols) of trimellitic acid anhydride, 254 g (1.0 mol) of bis(2-hydroxyethyl)terephthalate, 46 g (0.5 mols) of glycerin and 52.2 g (0.2 mols) of tris(2-hydroxyethyl)isocyanurate were charged in a 1 liter four-necked flask equipped with a condenser, a thermometer, a dropping funnel and a stirrer, and the mixture was heated while stirring. The stirring was continued at 180° C for 1.5 hours to obtain a colorless transparent viscous resinous product having an acid value of 98. At this point, the temperature was reduced to 110° C, and 60 g of aqueous ammonia of industrial grade (concentration, above 28%) diluted with 100 g of water was added thereto using the dropping funnel. The reaction mixture was stirred at 100° C for 30 minutes to evaporate the excess ammonia thereby obtaining a colorless transparent viscous aqueous insulating varnish. The varnish was then diluted with water to a viscosity of 21 poises. The non-volatile content of the resulting varnish was found to be 48.6%.

EXAMPLE 5

192 g (1.0 mol) of trimellitic acid anhydride and 254 g (1.0 mol) of bis(2-hydroxyethyl)terephthalate were charged in a 1 liter four-necked flask equipped with a condenser, a thermometer, a dropping funnel and a stirrer, and the resulting mixture was heated. The mixture began to melt in the vicinity of 120° C and the heating was further continued while stirring to the vicinity of 180° C whereupon water began to distil off. After reaction at this temperature for 1.5 hours, the acid value became 157. At this point, 92 g (1.0 mol) of glycerin was added to the reaction mixture followed by reacting at 170° C to 180° C for 1 hour to distil off water and the acid value of the reaction product became 116. The temperature was then reduced to 110° C, and 80 g of aqueous ammonia of industrial grade (concentration, above 28%) diluted with 200 g of water was added thereto using the dropping funnel. The mixture was agitated at 100° C for 30 minutes to evaporate the excess ammonia to obtain a colorless transparent aqueous insulating varnish. The resulting varnish was then diluted with water to a viscosity of 18 poises. The non-volatile content of the varnish was 46.1%.

EXAMPLE 6

192 g (1.0 mol) of trimellitic acid anhydride and 254 g (1.0 mol) of bis(2-hydroxyethyl)terephthalate were charged in a 1 liter four-necked flask equipped with a condenser, a thermometer, a dropping funnel and a stirrer followed by heating. The mixture began to melt in the vicinity of 120° C and the heating was continued while stirring to the vicinity of 180° C whereupon water began to distil off. After reaction at this temperature for 1 hour, the acid value became 167. At this point, 46 g (0.5 mols) of glycerin and 62 g (1.0 mol) of ethylene glycol were added thereto followed by reacting at 170° C to 180° C for 1 hour whereby water began to distil off and the acid value become 132. At this point, the temperature was reduced to 110° C, and 50 g of triethanolamine and 50 g of aqueous ammonia of industrial grade (concentration, above 28%) diluted with 100 g of water were added thereto using the dropping funnel. The resulting mixture was stirred at 100° C for 30 minutes to evaporate the excess ammonia to obtain a colorless transparent aqueous insulating varnish. The resulting varnish was then diluted with water to a viscosity of 15 poises. The non-volatile content of the varnish was 46.7%.

EXAMPLE 7

166 g (1.0 mol) of terephthalic acid and 155 g (2.5 mols) of ethylene glycol were charged in a 1 liter four-necked flask equipped with a condenser, a thermometer, a dropping funnel and a stirrer. The resulting mixture was reacted by heating at 190° C to 210° C for 12 hours while stirring to obtain a reaction product having an acid value of 0. At this point, the unreacted ethylene glycol was cautiously removed under reduced pressure. The reaction product thus obtained was confirmed to be bis(2-hydroxyethyl)terephthalate as a result of an elementary analysis as shown below.

Calcd.: C 56.69%, H 5.51%
Found: C 56.42%, H 5.57%

To the bis(2-hydroxyethyl)terephthalate thus obtained were added 254 g (1.0 mol) of trimellitic acid anhydride and 65 g (0.7 mols) of glycerin, and the resulting mixture was heated while stirring. In the vicinity of 180° C, water began to distil off, and the mixture was reacted at this temperature for 1.5 hours to an acid value of 148. At this point, the temperature was reduced to 110° C, and 50 g of N-methyldiethanolamine and 80 g of aqueous ammonia of industrial grade (concentration, above 28%) diluted with 200 g of water were added thereto using the dropping funnel. The resulting mixture was stirred at 100° C for 30 minutes to obtain a colorless transparent aqueous insulating varnish, which was then diluted with water to a viscosity of 25 poises. The non-volatile content of the resulting varnish was found to be 48.9%.

EXAMPLE 8

194 g (1.0 mol) of dimethylterephthalate, 186 g (3.0 mols) of ethylene glycol and 0.2 g of zinc acetate were charged in a 1 liter four-necked flask equipped with a condenser, thermometer, a dropping funnel and a stirrer, and the resulting mixture was heated while stirring. Methanol began to distil off in the vicinity of 160° C, and the mixture was reacted at 180° to 200° C for 5 hours whereupon 58 g of methanol was distilled therefrom. At this point, the ethylene glycol was removed by distillation under reduced pressure to obtain a pale yellow transparent viscous product. Vapor pressure measurement revealed that the thus obtained product had an average molecular weight of 950, indicating that the product was a polyethyleneterephthalate oligomer having the above described formula wherein n is an integer of 4 or 5.

To this oligomer obtained above were added 96 g (0.5 mols) of trimellitic acid anhydride and 46 g (0.5 mols) of glycerin, and the mixture was heated to the vicinity of 180° C while stirring whereupon water began to distil off. The mixture was reacted at this temperature for 1 hour to an acid value of 160. The temperature was then reduced to 110° C, and 120 g of aqueous ammonia of industrial grade concentration, above 28%) diluted with 100 g of water was added thereto using the dropping funnel. The resulting mixture was stirred at 100° C for 30 minutes to evaporate the excess ammonia to obtain a colorless transparent aqueous insulating varnish, which was then diluted with water to a viscosity of 18 poises. The non-volatile content of the varnish was 44.5%.

EXAMPLE 9

236.8 g (0.8 mols) of 3,4,3'-tricarboxydiphenyl ketone anhydride, 51.6 g (0.2 mols) of 4,4'-dicarboxydiphenyl ether, 254 g (1.0 mol) of bis(2-hydroxyethyl)terephthalate and 46 g (0.5 mols) of glycerin were charged in a 1 liter four-necked flask equipped with a condenser, thermometer, a dropping funnel and a stirrer, and the mixture was heated while stirring. Water began to distil off in the vicinity of 180° C, and the mixture was reacted at 180° to 200° C for 3 hours to obtain a colorless transparent viscous product having an acid value of 91. At this point, the temperature was reduced to 110° C, and 70 g of aqueous ammonia of industrial grade (concentration, above 28%) diluted with 100 g of water was added thereto using the dropping funnel. The resulting reaction mixture was stirred at 100° C for 30 minutes to evaporate the excess ammonia to obtain a colorless transparent aqueous insulating varnish. The varnish was then diluted with water to a viscosity of 18 poises. The non-volatile content of the resulting varnish was found to be 45.3%.

EXAMPLE 10

142 g (0.5 mols) of 3,4,4'-tricarboxydiphenyl ether anhydride, 21.6 g (0.1 mol) of naphthalene-2,6-dicarboxylic acid, 66.4 g (0.4 mols) of isophthalic acid, 177.8 g (0.7 mols) of bis(2-hydroxyethyl)terephthalate, 75 g (0.5 mols) of triethylene glycol and 23 g (0.25 mols) of glycerin were charged in a 1 liter four-necked flask equipped with a condenser, a thermometer, a dropping funnel and a stirrer, and the mixture was heated while stirring. Water began to distil off in the vicinity of 180° C, and the mixture was reacted at 180° to 220° C for 3.5 hours to obtain a colorless transparent viscous resinous product having an acid value of 112. At this point, the temperature was reduced to 110° C, and 70 g of aqueous ammonia of industrial grade (concentration, above 28%) diluted with 100 g of water was added thereto using the dropping funnel. The resulting mixture was stirred at 100° C for 30 minutes to evaporate the excess ammonia to obtain a colorless transparent aqueous insulating varnish. The varnish was then diluted with water to a viscosity of 22 poises. The non-volatile content of the varnish was 44.4%.

EXAMPLE 11

115.2 g (0.6 mols) of trimellitic acid anhydride, 101.6 g (0.4 mols) of bis(2-hydroxyethyl)terephthalate, 138 g (0.6 mols) of 4,4'-dihydroxymethyldiphenyl ether and 46 g (0.5 mols) of glycerin were charged in a 1 liter four-necked flask equipped with a condenser, a thermometer, a dropping funnel and a stirrer, and the mixture was heated while stirring. Water began to distil off in the vicinity of 180° C, and the reaction mixture was reacted at 180° to 190° C for 2 hours to obtain a colorless transparent viscous resinous product having an acid value of 28. The temperature was then reduced to 110° C, and 20 g of aqueous ammonia of industrial grade (concentration, above 28%) diluted with 100 g of water was added thereto using the dropping funnel. The resulting mixture was stirred at 100° C for 30 minutes to evaporate the excess ammonia to obtain a colorless transparent aqueous insulating varnish. The varnish was then diluted with water to a viscosity of 28 poises. The non-volatile content of the varnish was found to be 48.8%.

EXAMPLE 12

192 g (1.0 mol) of trimellitic acid anhydride and 381 g (1.5 mols) of bis(2-hydroxyethyl)terephthalate were charged in a 1 liter four-necked flask equipped with a condenser, a thermometer, a dropping funnel and a stirrer, and the mixture was heated while stirring. Water began to distil off in the vicinity of 180° C, and the mixture was reacted at 180° to 190° C for 1 hour to obtain a colorless transparent viscous resinous product having an acid value of 205. The temperature was then reduced to 110° C, and 130 g of aqueous ammonia of industrial grade (concentration, above 28%) diluted with 150 g of water was added thereto using the dropping funnel. The resulting mixture was stirred at 100° C for 30 minutes to evaporate the excess ammonia thereby obtaining a colorless transparent aqueous insulating varnish. The varnish was diluted with water to a viscosity of 30 poises. The non-volatile content of the varnish was 46.3%.

COMPARATIVE EXAMPLE 388 g (2.0 mols) of dimethylterephthalate, 124 g (2.0 mols) of ethylene glycol, 74 g (0.8 mols) of glycerin and 0.38 g of zinc acetate were charged in a liter four-necked flask equipped with a condenser, a thermometer, a dropping funnel and a stirrer, and the mixture was heated with stirring. The dimethyl terephthalate was melted at a temperature of 145° C whereby the reaction system became transparent. Methanol began to distil off from the vicinity of 160° C and the reaction was further carried out at 160° to 200° C for 5 hours and then at 200° C for 1 hour. Thereafter, the excess of the alcohol components was removed by distillation under reduced pressure to obtain a resin. Cresol of industrial grade was then added to the resulting resin to dissolve the resin so as to have a non-volatile content of 40%. To this was added tetrabutyl titanate in an amount of 2% by weight based on the total resin content to obtain a baking varnish. The resulting varnish had a viscosity of 30 poises.

The aqueous insulating varnishes obtained in Examples 1 to 12 and the baking varnish obtained in Comparative Example were applied onto an annealed copper wire having a diameter of 1.0 mm using dies and baked at 400° C and at a rate of 6.5 m/min using a vertical furnace having a height of 3.0 m. The properties of the resulting baked wires were determined according to JIS C 3210 (Polyester Copper Wire Test Method), and the results obtained are shown in the table below.

| | Example | | | | | | | | | | | | Comparative Ex. |
|---|---|---|---|---|---|---|---|---|---|---|---|---|---|
| | 1 | 2 | 3 | 4 | 5 | 6 | 7 | 8 | 9 | 10 | 11 | 12 | |
| Enameled Wire Diameter (mm) | 1.071 | 1.075 | 1.073 | 1.075 | 1.073 | 1.073 | 1.075 | 1.071 | 1.073 | 1.072 | 1.076 | 1.075 | 1.080 |
| Bare Wire Diameter (mm) | 0.995 | 0.995 | 0.995 | 0.995 | 0.995 | 0.995 | 0.995 | 0.995 | 0.995 | 0.995 | 0.995 | 0.995 | 0.995 |
| Film Thickness (mm) | 0.038 | 0.040 | 0.039 | 0.040 | 0.039 | 0.039 | 0.040 | 0.038 | 0.039 | 0.038 | 0.040 | 0.040 | 0.043 |
| Self-Diameter Windability (normal conditions) | good | good | good | good | good | good | good | good | good | good | good | good | good |
| Self-Diameter Windability (20% stretched) | good | good | good | good | good | good | good | good | good | good | good | good | good |
| Windability after Heating (200° C × 24 hours) | 2d | 2d | 2d | 2d | 2d | 2d | 2d | 2d | 2d | 2d | 1d | 2d | 2d |
| Abrasion Resistance (600 g load) (cycle times) | 61 | 52 | 55 | 48 | 57 | 58 | 52 | 46 | 63 | 49 | 58 | 50 | 40 |
| Cut Through Temperature (2.1 Kg load, 2° C/min) | 332 | 318 | 325 | 365 | 321 | 315 | 336 | 318 | 315 | 321 | 310 | 330 | 310 |
| Heat Shock Resistance (180° C × 2 hours) | 3d | 4d | 3d | 3d | 3d | 2d | 3d | 2d | 3d | 2d | 2d | 3d | 4d |
| Breakdown Voltage (KV) | 13.2 | 14.0 | 13.6 | 13.1 | 13.5 | 13.5 | 13.8 | 12.9 | 14.1 | 13.6 | 14.5 | 12.8 | 12.6 |
| Chemical Resistance (after dipping for 24 hours at room temperature) | | | | | | | | | | | | | |
| Pencil Hardness (normal conditions) | 5H | 5H | 5H | 5H | 5H | 5H | 5H | 5H | 5H | 5H | 5H | 5H | 5H |
| Pencil Hardness (after Dipping in 5% sodium hydroxide) | 4H | 5H | 4H | 4H | 4H | 5H | 5H | 5H | 5H | 4H | 5H | 4H | HB |
| Pencil Hardness after Dipping in Sulfuric Acid (specific gravity: 1.2) | 5H | 5H | 5H | 5H | 5H | 5H | 5H | 5H | 5H | 5H | 5H | 5H | 5H |
| Crazing in Water (3% stretched) (No. of Samples Crazing Observed/No. of Samples Tested) | 0/5 | 0/5 | 0/5 | 0/5 | 0/5 | 0/5 | 0/5 | 0/5 | 0/5 | 0/5 | 0/5 | 0/5 | 1/5 |

As can be seen from the results shown in the Table above, the baked coating film obtained according to the present invention exhibits superior properties over the conventional solvent-type varnishes which are dissolved in solvents such as cresol, xylol, naphtha and the like in terms of abrasion resistance, alkali resistance, crazing property in water and the like. Further, according to the present invention, since water is used as a medium, evaporation of solvents or harmful gases into the air at baking can be avoided thereby eliminating air pollution which can provide extremely safe working environment without any bad smell and danger of fire or explosion. In addition, the use of water as a medium makes the cost extremely low in comparison with the conventional solvent-type varnishes and, therefore, the present invention proves to be of great value from an industrial viewpoint.

While the present invention has been described in detail and with reference to specific embodiments, it will be apparent to one skilled in the art that many changes and modifications can be made therein without departing from the spirit and scope of the invntion.

What is claimed is:

1. An aqueous insulating varnish which comprises an aqueous medium containing dissolved therein a polyester resin having an acid value of about 20 to 200 with a volatile basic compound, the resin being obtained by reacting A. an organic polycarboxylic acid component comprising
  a. at least 30 mol % of at least one of an aromatic tricarboxylic acid and the anhydride thereof in which up to about 30 mol % of the tricarboxylic acid and the anhydride thereof can be replaced by at least one of an aromatic tetracarboxylic acid and the anhydride thereof, and
  b. about 0 to 70 mol % of at least one of a dicarboxylic acid and the anhydride thereof, and B. an organic polyhydric alcohol component containing at least 20 mol % of a polyethylene terephthalate oligomer represented by the formula

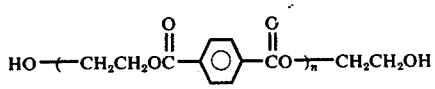

wherein $n$ is an integer of 1 to 5, in a OH/COOH equivalent ratio of about 1.0 to 2.0.

2. The aqueous insulating varnish of claim 1, wherein said aromatic tricarboxylic acid is (i) trimellitic acid or the anhydride thereof, hemimellitic acid or the anhydride thereof or trimesic acid having the formula

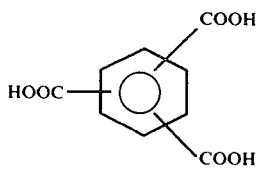

(ii) a diphenyltricarboxylic acid having the formula

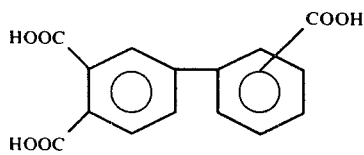

or the anhydride thereof, (iii) a tricarboxydiphenyl ether, a tricarboxydiphenylmethane, a tricarboxydiphenyl sulfide, a tricarboxydiphenyl sulfone, a tricarboxydiphenyl ketone or a tricarboxydiphenylpropane having the formula

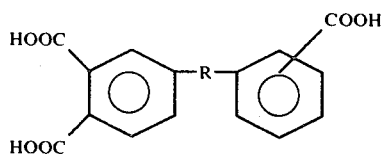

wherein R represents a methylene group, an oxygen atom, a sulfur atom, a —SO$_2$— group,

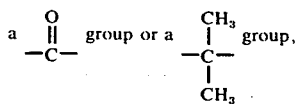

or the anhydrides thereof or (iv) mixtures thereof, and wherein said dicarboxylic acid is (i) succinic acid; (ii) succinic anhydride; (iii) malonic acid (iv) adipic acid; (v) sebacic acid; (vi) phthalic acid; (vii) phthalic anhydride; (viii) terephthalic acid; (ix) isophthalic acid; (x) a naphthalenedicarboxylic acid having the formula

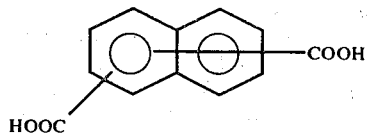

(xi) a dicarboxydiphenyl having the formula

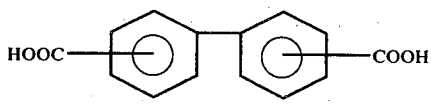

(xii) a dicarboxydiphenyl sulfide, a dicarboxydiphenylmethane, a dicarboxydiphenyl ether, a dicarboxydiphenyl sulfone, a dicarboxydiphenyl ketone or a dicarboxydiphenylpropane having the formula

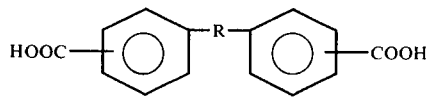

wherein R represents a methylene group, an oxygen atom, a sulfur atom, a —SO$_2$— group,

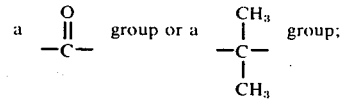

or (xiii) mixtures thereof.

3. The aqueous insulating varnish of claim 1, wherein said organic polyhydric alcohol component includes in addition an organic polyhydric alcohol selected from the group consisting of ethylene glycol, propylene glycol, 1,4-butanediol, 1,5-pentanediol, 1,6-hexanediol, 1,7-heptanediol, 1,8-octanediol, 1,9-nonanediol, 1,10-decanediol, diethylene glycol, dipropylene glycol, tris(2-hydroxyethyl)isocyanurate, 1,2,6-hexanetrial, 3-methyl-1,3,5-hexanetriol, pentaerythritol, 4,4'-dihydroxymethyl-diphenyl, 4,4'-dihydroxyethyldiphenyl, 4,4'-dihydroxymethyldiphenylmethane, 4,4'-dihydroxyethyldiphenylmethane, 4,4'-dihydroxymethyldiphenyl ether, 4,4'-dihydroxyethyldiphenyl ether, 4,4'dihydroxymethyldiphenyl sulfone, 4,4'-dihydroxyethyldiphenyl sulfone, 4,4'-dihydroxymethyldiphenyl ketone, 4,4'-dihydroxyethyldiphenyl ketone, 4,4'-dihydroxymethyldiphenylpropane, 4,4'-dihydroxyethyldiphenylpropane, 4,4'-dihydroxymethyl sulfide, 4,4'-dihydroxyethyldiphenyl sulfide and mixtures thereof.

4. The aqueous insulating varnish of claim 1, wherein the acid value of said polyester resin ranges from 50 to 150 and said OH/COOH equivalent ratio ranges from 1.0 to 1.5.

5. The aqueous insulating varnish of claim 1, wherein said volatile base is ammonia, a trialkylamine, an N-alkyldiethanolamine, an N,N-dialkylethanolamine, monoethanolamine, diethanolamine, triethanolamine or mixtures thereof.

6. The aqueous insulating varnish of claim 1, wherein said varnish has a concentration ranging from about 30 to 55% by weight and a viscosity of 30° C measured with a B-type viscometer ranging from about 1 to 100 poises.

7. The aqueous insulating varnish of claim 1, including a film-forming assistant in an amount ranging from about 5 to about 50% by weight based on the weight of the non-volatile components contained in the varnish, said film-forming assistant being selected from the group consisting of ethylene glycol monomethyl ether, ethylene glycol monoethyl ether, ethylene glycol monoisopropyl ether, ethylene glycol monobutyl ether, ethylene glycol monoisobutyl ether, diethylene glycol monoethyl ether, diethylene glycol monoisopropyl ether, diethylene glycol monobutyl ether, diethylene glycol monoisobutyl ether, triethylene glycol monomethyl ether, triethylene glycol monoethyl ether, triethylene glycol monobutyl ether, ethylene glycol monomethyl ether acetate, ethylene glycol monoethyl ether acetate, ethylene glycol, propylene glycol, diethylene glycol, dipropylene glycol, triethylene glycol, glycerin, N,N-dimethylformamide, N,N-dimethylacetamide, N,N-diethylformamide, N-methyl-2-pyrrolidone, N,N-diethylacetamide, N,N-dimethylmethoxyacetamide and N-methylcaprolactam.

8. The aqueous insulating varnish of claim 1, wherein said varnish contains from about 0.3 to 3 equivalents of said volatile base to the equivalents of free carboxyl groups in said varnish.

9. A wire enamel comprising an aqueous insulating varnish, wherein said aqueous insulating varnish comprises an aqueous medium containing dissolved therein a polyester resin having an acid value of about 20 to 200 with a volatile basic compound, the resin being obtained by reacting
   A. an organic polycarboxylic acid component comprising,
      a. at least 30 mol % of at least one of an aromatic tricarboxylic acid and the anhydride thereof in which up to about 30 mol % of the tricarboxylic acid and the anhydride thereof can be replaced by at least one of an aromatic tetracarboxylic acid and the anhydride thereof, and
      b. about 0 to 70 mol % of at least one of a dicarboxylic acid and the anhydride thereof, and
   B. an organic polyhydric alcohol component containing at least 20 mol % of a polyethylene terephthalate oligomer represented by the formula

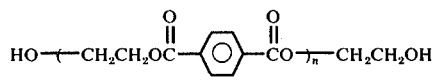

wherein n is an integer of 1 to 5, in a OH/COOH equivalent ratio of about 1.0 to 2.0.

10. A coated article comprising a substrate having thereon a coated and baked layer of an aqueous insulating varnish, wherein said aqueous insulating varnish comprises an aqueous medium containing dissolved therein a polyester resin having an acid value of about 20 to 200 with a volatile basic compound, the resin being obtained by reacting
    A. an organic polycarboxylic acid component comprising:
       a. at least 30 mol % of at least one of an aromatic tricarboxylic acid and the anhydride thereof in which up to about 30 mol % of the tricarboxylic acid and the anhydride thereof can be replaced by at least one of an aromatic tetracarboxylic acid and the anhydride thereof, and
       b. about 0 to 70 mol % of at least one of a dicarboxylic acid and the anhydride thereof, and
    B. an organic polyhydric alcohol component containing at least 20 mol % of a polyethylene terephthalate oligomer represented by the formula

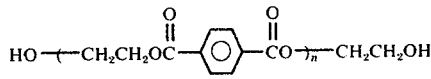

wherein n is an integer of 1 to 5, in a OH/COOH equivalent ratio of about 1.0 to 2.0.

11. The aqueous insulating varnish of claim 1, wherein said organic polycarboxylic acid component is said aromatic tricarboxylic acid and the anhydride thereof.

12. The aqueous insulating varnish of claim 1, wherein n is 1 for said polyethylene terephthalate oligomer.

* * * * *